Patented May 30, 1933

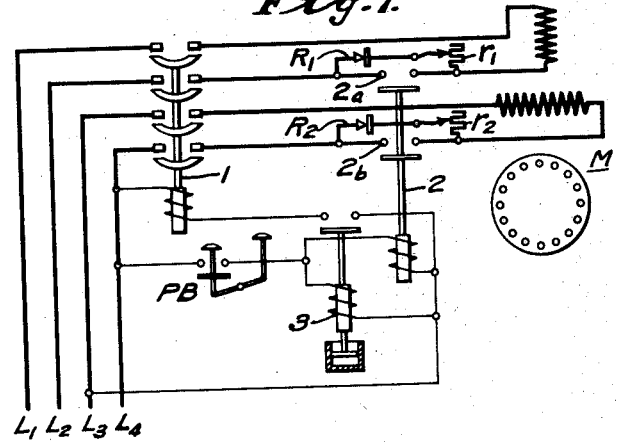
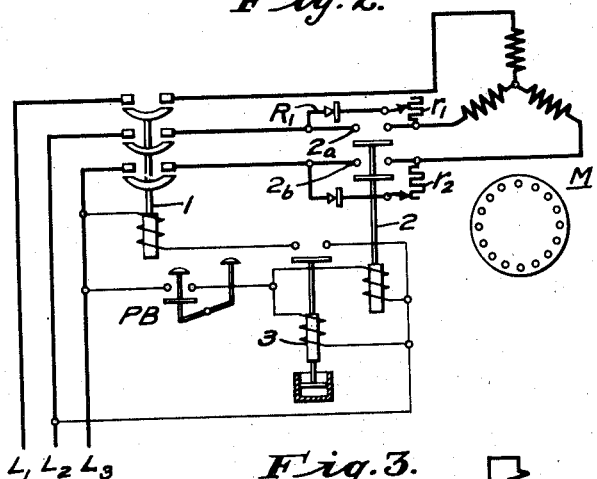
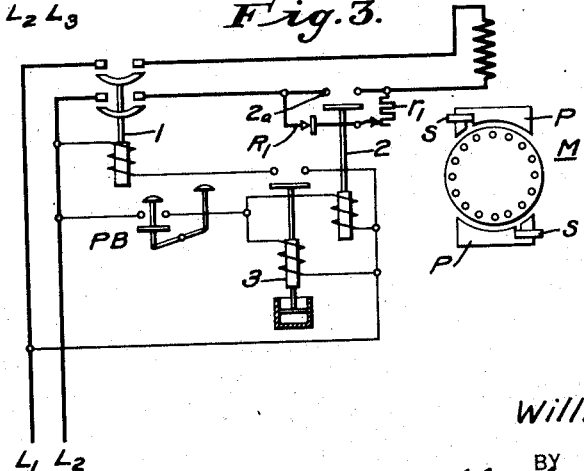

1,911,356

UNITED STATES PATENT OFFICE

WILLIAM F. EAMES, OF EDGEWOOD, PENNSYLVANIA, ASSIGNOR TO WESTINGHOUSE ELECTRIC & MANUFACTURING COMPANY, A CORPORATION OF PENNSYLVANIA

MOTOR CONTROL SYSTEM

Application filed February 15, 1930. Serial No. 428,649.

My invention relates to motor control systems and has particular relation to dynamic braking systems for alternating current motors, of the type in which the motor is braked by supplying direct current to the motor primary, the motor being brought to rest by the currents induced in the secondary. Such systems have desirable braking characteristics, the braking torque being present at all motor speeds, and always opposing the direction of motor rotation, so that no speed responsive device is necessary to interrupt the braking connections when the motor is brought to rest; as is necessary, for example, in plugging systems.

However, all systems of this character made according to the teachings of the prior art, and with which I am familiar, have required a separate source of direct current, the motor being disconnected from the alternating current source before being connected to the direct current source. As a direct current source is not always available, it has not been practicable to use this system of braking in all applications for which its characteristics are suitable. Furthermore, where this system is used, during the transition period between the interruption of motoring connections and the establishment of braking connections, the motor is disconnected entirely and develops no torque. The temporary failure of torque, due to this cause, is objectionable, as it is desirable to have the motor under complete control at all times while in motion.

It is, accordingly, an object of my invention to provide a motor control system for alternating current motors in which the motor is braked by supplying direct current to the motor primary and in which a separate source of direct current for this purpose is not necessary.

Another object of my invention is to provide a motor control system for alternating current motors in which the motor is braked by supplying direct current to the motor primary and in which there is no loss of torque in the transition period between the interruption of motoring connections and the establishment of braking connections.

According to my invention, I provide a rectifier between the alternating current source and the motor, and establish motoring connections for the motor independent of the rectifier, and braking connections through the rectifier.

Other objects of my invention will become evident from the following detailed description, taken in conjunction with the accompanying drawing, in which Figure 1 is a diagrammatic view of a system of control organized in accordance with the present invention, showing the application of the invention to the control of two phase motors;

Fig. 2 is a view similar to Fig. 1, showing the application of the invention to the control of three phase motors;

Fig. 3 is a view, similar to Fig. 1, showing the application of the invention to the control of single phase motors.

Referring to the drawing, the system shown in Fig. 1 comprises a two phase induction motor M arranged to be connected to a set of two phase supply conductors L1, L2, L3 and L4 by means of a line switch 1. A set of contact members $2a$ of a switch 2 is interposed in one phase of the connections between the switch 1 and the motor M, and a similar set of contact members $2b$ is interposed in the other phase. A circuit comprising a rectifier R1 and an adjustable resistor $r1$ is connected in shunt to the contact members $2a$. A circuit comprising a rectifier R2 and an adjustable resistor $r2$ is connected in shunt to the contact members $2b$. The rectifiers R1 and R2 may be of any type but are preferably of the copper oxide type.

The operating coil of the line switch 1 is arranged to be connected to the supply conductors L3 and L4 by means of a delayed opening time element relay 3. While for convenience, I have illustrated the time element relay 3 as a dash-pot relay, it will be understood that this relay may be of any usual time element type.

The operating coils of switch 2 and time element relay 3 are arranged to be connected to the supply conductors L3 and L4 by means of a push-button switch PB of any suitable type.

The arrangement shown in Fig. 2 is identical in every respect with that shown in Fig. 1 except that the motor M is a three phase motor and the supply conductors L1, L2 and L3 constitute a three-phase source.

The arrangement shown in Fig. 3 is identical with the arrangement shown in Fig. 1, except that the motor M is a single phase induction motor with a "shaded" pole starting device and the supply conductors L1 and L2 constitute a single phase source. The motor pole-pieces are diagrammatically illustrated at P and the shading coils at S. With this arrangement, only one rectifier R1 and one resistor r1 are required.

Referring again to Fig. 1, the operation of the above-described apparatus may be set forth as follows: Upon closure of the contact members of push-button switch PB, an energizing circuit for the operating coils of switch 2 and time element relay 3 is completed through the push-button contact members. Switch 2 and time element relay 3 close; both relays closing immediately as the time element device of relay 3 delays the relay only in opening. The relay 3, in closing, completes an energizing circuit for the operating coil of line switch 1, and the switch 2, in closing, short-circuits the rectifiers R1 and R2 and resistors r1 and r2. Line switch 1 closes, connecting the primary windings of motor M to supply conductors L1, L2, L3 and L4. The motor M now accelerates to operating speed in the usual manner and continues to operate until the push-button switch PB is operated to break the circuit of the operating coils of switch 2 and time element relay 3.

When the contact members of push-button PB are opened, switch 2 drops out immediately but the opening of time element relay 3 is delayed for a predetermined period of time by the action of the dash-pot. Switch 2 in dropping out opens its contact members 2a and 2b, inserting the rectifier R1 and resistor r1 in series with one phase of the windings of motor M, and the rectifier R2 and resistor r2 in series with the other phase.

The motor M now receives rectified current from the supply conductors L1, L2, L3 and L4. The pulsations of the rectified current are smoothed out somewhat by the inductance of the motor windings, stationary magnetic poles are set up in the motor magnetic structure, and the armature conductors, cutting through the stationary magnetic poles, have braking currents induced in them which bring the motor to rest.

At the expiration of a predetermined period of time, time element relay 3 drops out, breaking the energizing circuit for the operating coil of line switch 1. Line switch 1 drops out, disconnecting the motor from the supply conductors L1, L2, L3 and L4. The system is now in its initial condition and further operation of the motor may be initiated by operation of the push-button switch PB.

By adjusting the resistors r1 and r2, the range of braking torque may be varied to suit requirements.

The operation of the systems shown in Figs. 2 and 3 will be readily understood from the above-description of the operation of the system shown in Fig. 1.

While I have illustrated only the simplest form of rectifier connections between the alternating current sources and the motor, it will be understood that any form of connections involving any number of rectifier units may be used. Also, while I have illustrated my invention in connection with induction motors, it will be understood that the invention is applicable to all forms of commutating and non-commutating alternating current motors in which the whole or a component of the secondary current is produced by inductive action. In the case of single phase induction motors, my invention may be used with or without a starting device, and if used with a starting device, the latter may be of any type.

I do not, therefore, wish to be restricted to the specific structural details, arrangement of parts or circuit connections herein set forth, as various modifications thereof may be affected without departing from the spirit and scope of my invention. I desire, therefore, that only such limitations shall be imposed as are indicated in the appended claims.

I claim as my invention:

1. In a motor-control system, an alternating-current motor, an alternating-current source, a rectifier, a switch and conductors connecting said motor to said source in a circuit including, in parallel relationship, said rectifier and said switch, whereby the direction of torque of said motor may be controlled by said switch without interruption of the connection of said motor to said source.

2. In a motor-control system, an alternating-current motor, an alternating-current source, a rectifier, a switch, a resistor and conductors connecting said motor to said source in a circuit including, in parallel relationship, a first branch including said rectifier and said resistor and a second branch including said switch, whereby the direction of torque of said motor may be controlled by said switch without interruption of the connection of said motor to said source.

3. In a motor control system, an alternating current motor, an alternating current surce, a rectifier, means for establishing connections between said source and said motor for running said motor, means for establishing connections between said source and said motor through said rectifier for braking said motor, and means for interrupting said last mentioned connections at the expiration of a predetermined time interval after establishment thereof.

4. In a motor control system, an alternating current motor, an alternating current source, a rectifier, a time element device, means for establishing connections between said source and said motor, means for establishing connections between said source and said motor through said rectifier and for initiating operation of said time element device, and means controlled by said time element device for disconnecting said motor.

5. In a motor control system an alternating current motor, an alternating current source, a rectifier, connections between said source and said motor through said rectifier, a switch in said connections, a second switch connected in shunt to said rectifier, a time element device, means for closing said switches, means for opening said second switch and for initiating operation of said time element device, and means controlled by said time element device for opening said first-mentioned switch.

In testimony whereof, I have hereunto subscribed my name this 12th day of February 1930.

WILLIAM F. EAMES.